(12) United States Patent
Potter

(10) Patent No.: US 10,473,489 B1
(45) Date of Patent: Nov. 12, 2019

(54) FIBER OPTIC PANEL WITH INTEGRATED SENSORS

(71) Applicant: Valeo North America, Inc., Troy, MI (US)

(72) Inventor: Brant Potter, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 16/043,957

(22) Filed: Jul. 24, 2018

(51) Int. Cl.
| | |
|---|---|
| *G01D 5/26* | (2006.01) |
| *G02B 6/122* | (2006.01) |
| *G02B 6/293* | (2006.01) |
| *G09G 3/00* | (2006.01) |
| *G02B 6/13* | (2006.01) |
| *G02B 6/26* | (2006.01) |

(52) U.S. Cl.
CPC .......... *G01D 5/268* (2013.01); *G02B 6/1221* (2013.01); *G02B 6/13* (2013.01); *G02B 6/266* (2013.01); *G02B 6/29361* (2013.01); *G09G 3/002* (2013.01)

(58) Field of Classification Search
CPC ...... G02B 6/122; G02B 6/13; G02B 6/12004; G02B 6/25; G02B 6/1221; G02B 6/29361; G02B 6/266; H01L 21/822; H01L 21/67092; B23K 26/0624; G01D 5/268; G09G 3/002
See application file for complete search history.

(56) References Cited

U.S. PATENT DOCUMENTS

| | | | |
|---|---|---|---|
| 5,195,162 A | | 3/1993 | Sultan et al. |
| 2002/0097978 A1* | | 7/2002 | Lowry .................. G09F 9/305 385/147 |
| 2010/0232739 A1 | | 9/2010 | Nowsch |
| 2013/0020485 A1 | | 1/2013 | Jung et al. |
| 2016/0216443 A1 | | 7/2016 | Morgan et al. |

* cited by examiner

*Primary Examiner* — Ryan A Lepisto
(74) *Attorney, Agent, or Firm* — Oblon, McClelland, Maier & Neustadt, L.L.P.

(57) ABSTRACT

A lighting apparatus is composed of optical fibers that are grouped at one end thereof in a bundle so as to optically couple to a common light source. A set of the optical fibers are configured to emit light transversely to the optical axis thereof to form an illumination region in a fiber optic panel. At least one sensor is coupled to at least one of the optical fibers in the bundle and generates an electrical signal in response to a physical phenomenon.

9 Claims, 15 Drawing Sheets

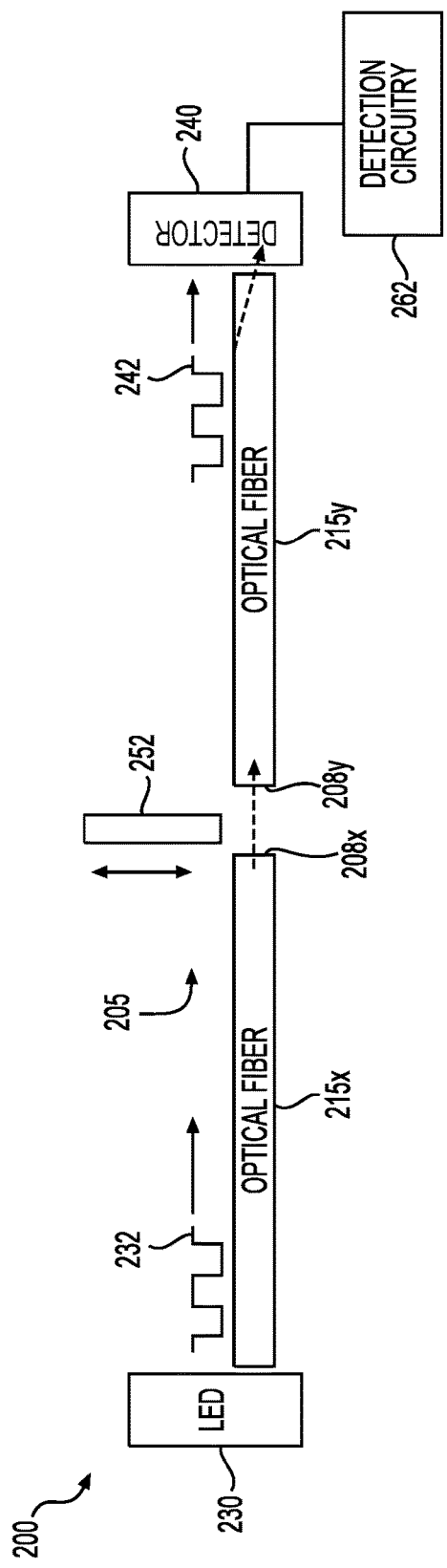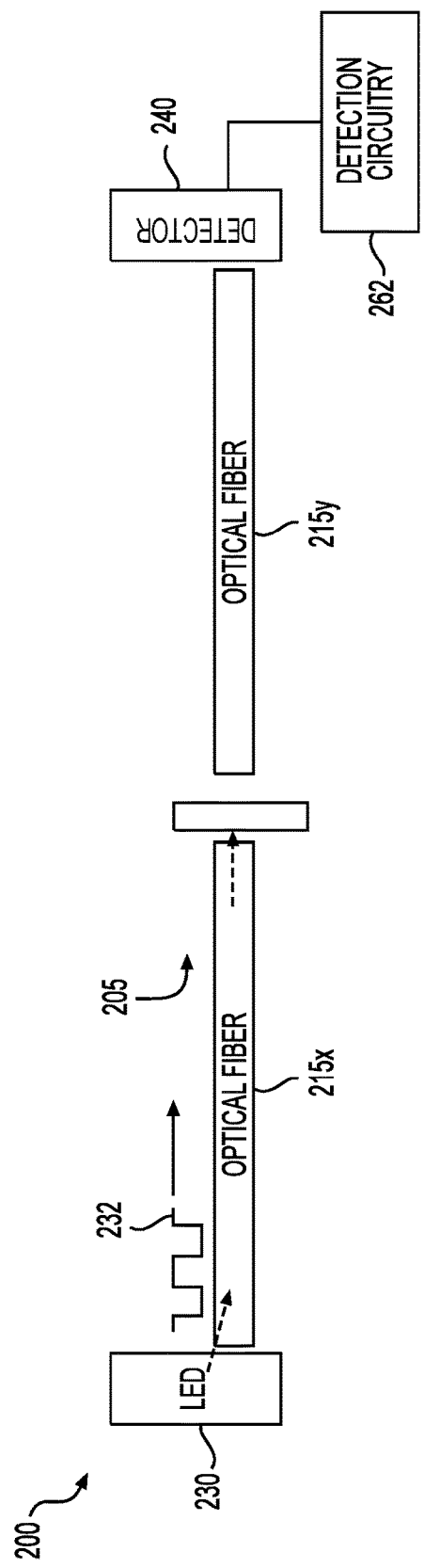

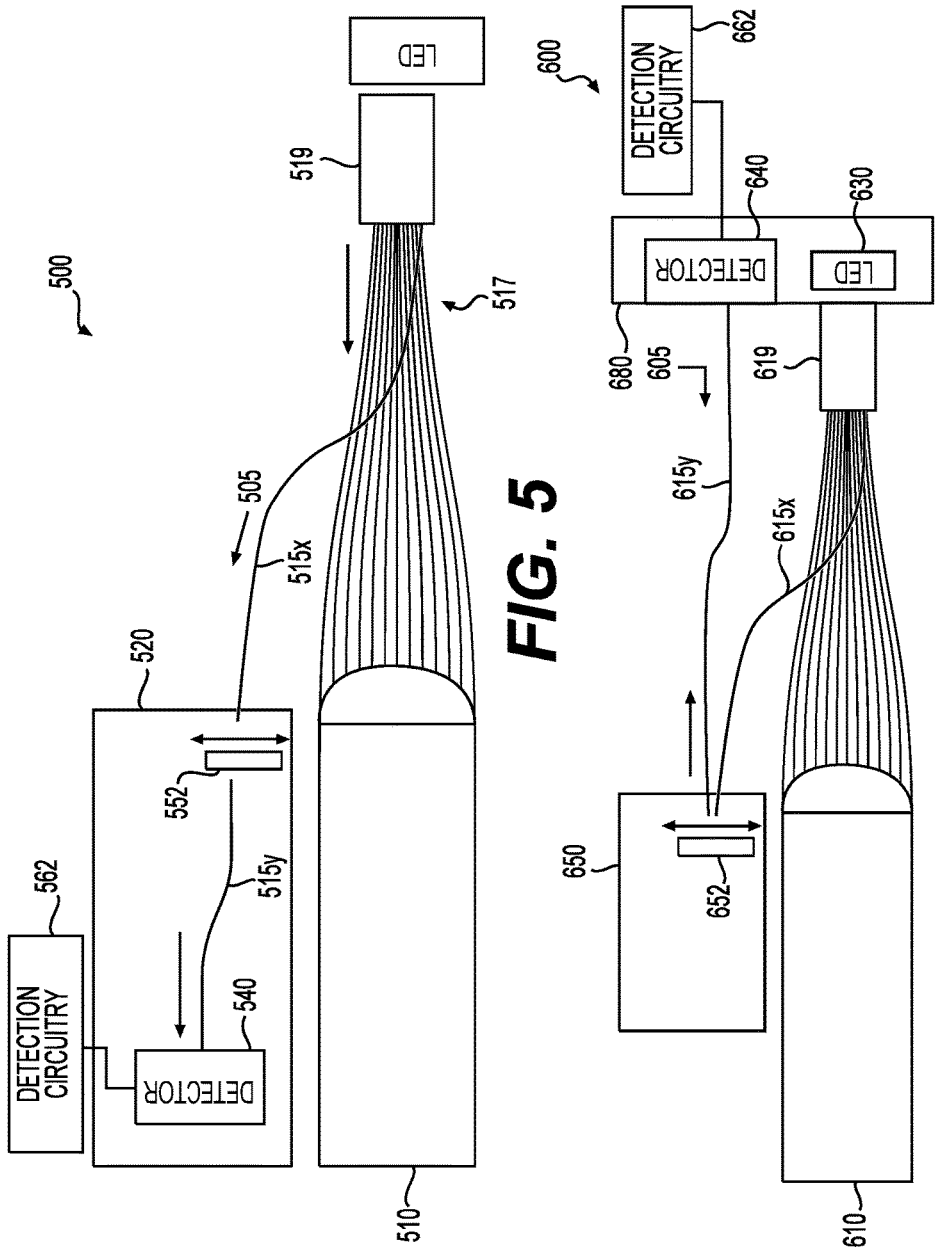

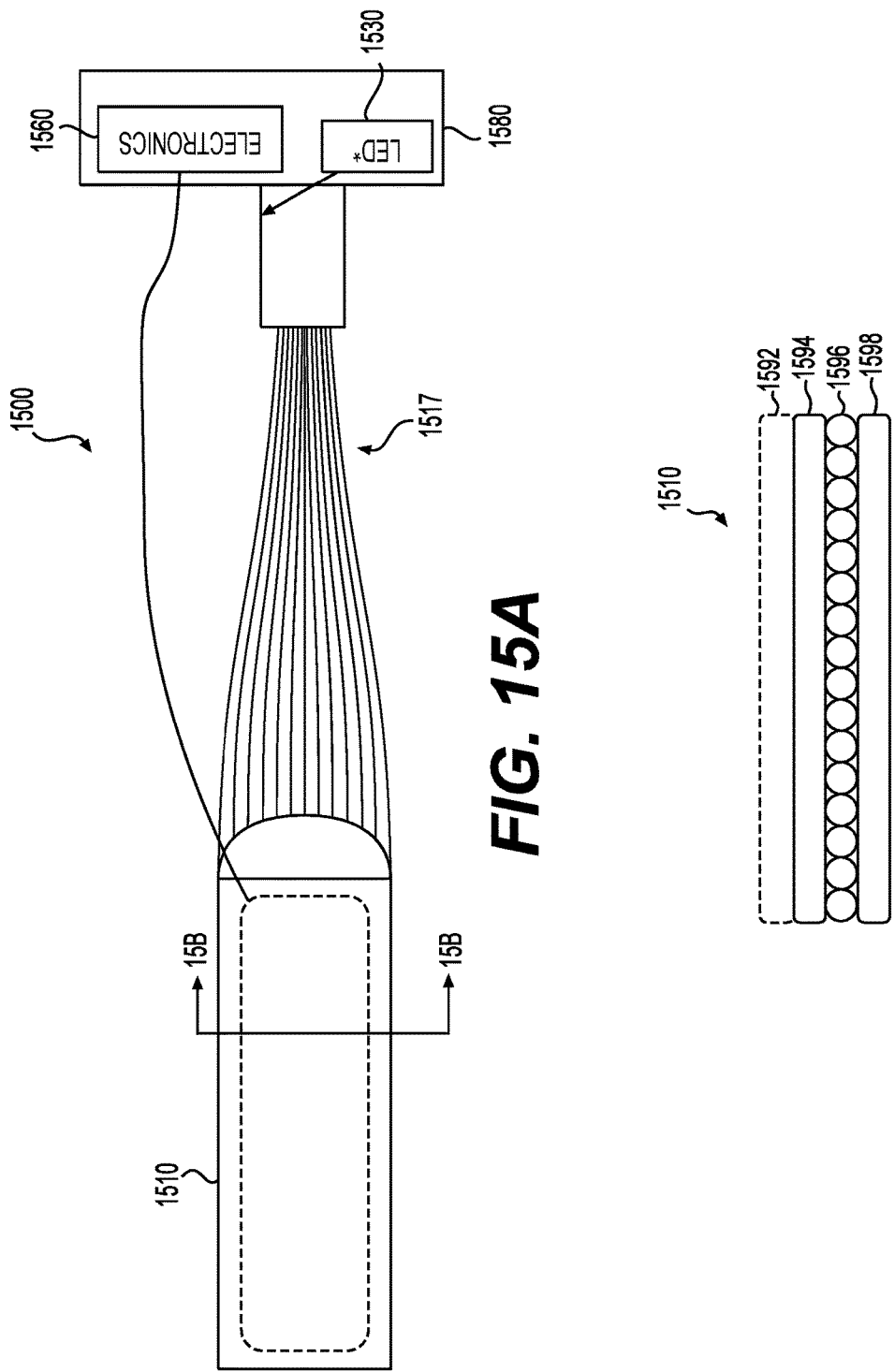

FIBER OPTIC PANEL WITH INTEGRATED SENSORS

BACKGROUND

The use of fiber optic technology in automotive applications, e.g., lighting, sensing, communications, etc., has increased significantly over the last decade. Manufacturers use fiber optics for automotive lighting for a number of reasons, the most obvious of which is that optical fibers transmit "cold" light, making it a safe alternative to traditional sealed beam or halogen lighting. The light source in fiber optic automotive lighting is also typically easily accessible. Moreover, fiber optics allows for the light source to be considerably separated from the output location, thereby reducing the physical space requirements over many conventional lighting techniques.

Fiber optic panels are constructed from many optical fibers, at least some of which are configured to emit light transversely to their optical axes. Fiber optic panels can be formed into different shapes allowing lighting designers considerable freedom in their designs. Fiber optic panels are becoming more widely used as more diverse lighting configurations are implemented.

Sensing various phenomena in automotive settings plays an important role in onboard safety, automotive control, convenience and environmental systems. With each subsequent model year, more and more automotive functions are implemented that require particular sensors. Optical signals are immune to electromagnetic interference (EMI) and radio frequency interference (RFI) and optical sensors have relatively low cost. Accordingly, more and more manufacturers are utilizing fiber optics as the sensing method of choice for various automotive applications.

SUMMARY

A lighting apparatus is composed of optical fibers that are grouped at one end thereof in a bundle so as to optically couple to a common light source. A set of the optical fibers are configured to emit light transversely to the optical axis thereof to form an illumination region in a fiber optic panel. At least one sensor is coupled to at least one of the optical fibers in the bundle and generates an electrical signal in response to a physical phenomenon.

BRIEF DESCRIPTION OF THE DRAWINGS

FIG. 2A and FIG. 2B are schematic diagrams of a fiber optic sensor circuit by which the present inventive concept can be embodied.

FIG. 5 is a schematic diagram of an example fiber optic panel system by which the present inventive concept can be embodied.

FIG. 6 is a schematic diagram of another example fiber optic panel system by which the present inventive concept can be embodied.

FIG. 15A and FIG. 15B are schematic diagrams of an example fiber optic panel system by which the present inventive concept can be embodied.

DETAILED DESCRIPTION

Figure 1A:
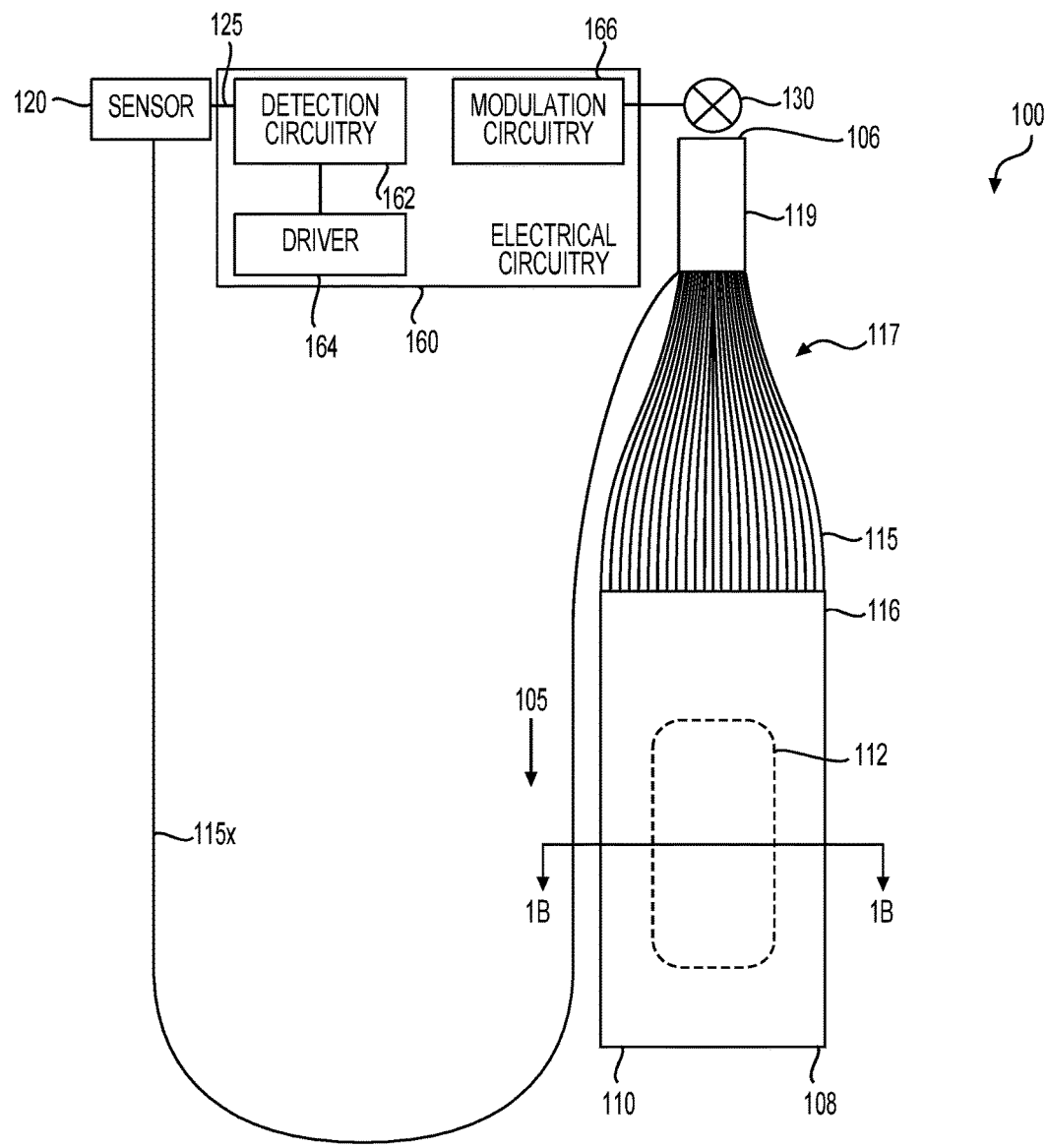
FIG. 1A and FIG. 1B are illustrations of an example fiber optic panel system by which the present inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Figure 1B:
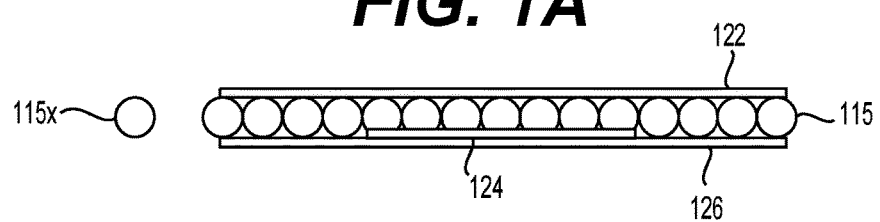

FIG. 1A and FIG. 1B, alternatively referred to herein as FIG. 1, is an illustration of an example fiber optic panel system 100 by which the present invention can be embodied. Fiber optic panel system 100 comprises a plurality of optical fibers, representatively illustrated at optical fiber 115 and referred to herein as optical fiber(s) 115, assembled into a generally planar fiber optic panel 110. As is illustrated in FIG. 1B, fiber optic panel 110 may comprise a plurality of optical fibers 115 disposed on a backing 126 and overlaid with an optically transmissive medium or component 122. Backing component 126 may itself be transmissive, but may also be opaque or even reflective so as to facilitate illumination from the panel's face. Other components may be used as well in the construction of fiber optic panel 110, such as a fluorescent component 124, by which a color of the light from light source 130 is transformed.

Certain optical fibers 115 of fiber optic panel may be constructed, treated, or otherwise configured to emit light transversely to their optical axes i.e., the line along the center of the optical fiber's core. The general construction of such a fiber optic panel is described in WO 2016/204779 A1, filed as PCT/US2015/036629 on Jun. 19, 2015 and entitled Fiber Optic Lighting and/or Signaling System for a Vehicle. WO 2016/204779 A1 is incorporated herein by reference in its entirety. Several of such treated optical fibers 115 may be positioned in fiber optic panel 110 to form an illumination region 112, from which light from light source 130 is emitted. It is to be understood that illumination region 112 may be of any shape and not just the generally rectangular shape exemplified in FIG. 1A. Additionally, illumination region 112 may encompass the entirety of fiber optic panel 110 or may be confined to a specific area on fiber optic panel 110.

In certain embodiments, optical fibers 115 are grouped into a fiber optic bundle 117, such as by way of a ferrule 119, for purposes of efficient optical coupling of optical fibers 115 to a common light source 130. The present invention is not limited to a particular light source 130; for purposes of explanation, light source 130 will be described herein as a light emitting diode (LED), although other light sources may be used without departing from the spirit and intended scope of the present invention.

For purposes of description, optical fibers 115 are said to have an end proximal to the light source 130, referred to herein as the proximal end 106 of optical fiber(s) 115, and an end distal to the light source 130, referred to herein as the distal end 108 of optical fiber(s) 115. Accordingly, the ends of fiber optic panel 110 may be identified as a proximal end 116 and a distal end 118.

Certain embodiments of the present invention utilize various optical fibers 115 of fiber optic panel assembly 100 to form optical circuits that can be used to implement various functions. The present invention is not limited to the types of functions that can be realized; upon review of this disclosure, those having skill in optical circuits will recognize numerous functions that can be carried out by embodiments of the present invention without departing from the spirit and intended scope thereof. As one example, fiber optic panel system 100 may include an optical circuit 105 that includes a sensor 120. Sensor 120 may be constructed or otherwise configured to generate an electrical signal 125 in response to some physical phenomena, e.g., an applied force, temperature, humidity, pressure, etc. Sensor device 120 may be a switch or other device that makes or breaks a connection in optical circuit 105. Sensor 140 may also be constructed to measure temperature, humidity, pressure, proximity and other phenomena that can be detected and measured. Upon review of this disclosure, those having skill in optical circuits will recognize numerous sensors and other optical devices that can be used in conjunction with embodiments of the present invention without departing from the spirit and intended scope thereof.

Fiber optic panel system 100 may include electrical circuitry 160 by which a sensed phenomenon can bring about some action, e.g., opening vehicle doors, turning interior lighting on/off, activation of door lock/unlock, etc. Detection circuitry 162 may be constructed or otherwise configured to change state in response to certain conditions being met, such as meeting a threshold condition. Detection circuitry 162 may issue a signal to a driver 164 that provides electrical power to a target device (not illustrated) that takes an action in response to the state of detection circuitry 162, such as opening a vehicle door or hatch. Those having skill in the electrical arts will recognize numerous circuits by which detector circuitry 162 and driver circuitry 164 can be realized without specific implementation details being disclosed herein.

Sensor 120 may require an optical signal on which a certain modulation is imposed to operate and, to that end, light source 130 may be coupled to modulation circuitry 166. It is to be understood that such modulation may be any modulation that can be imparted to an optical signal, including a color shift or color filtration, pulse width modulation, etc. In one embodiment, the modulation would be fast enough and in the correct form as not to be seen by the human eye. For example, a square wave having a frequency of greater than 100 Hz may be used, preferably in the range of 500 Hz to 1000 Hz. Higher frequencies approaching 1 GHz may be used for LiFi type applications. Those having skill in the electrical arts will recognize numerous circuits by which modulation circuitry 166 can be realized without specific implementation details being disclosed herein FIG. 2A and FIG. 2B, alternatively referred to as FIG. 2, are schematic diagrams of a fiber optic sensor circuit 200 by which the present invention can be embodied. Fiber optic sensor circuit 200 may comprise an optical circuit 205 that conveys an optical signal 232 generated at LED 230 to an optical detector 240, such as a photodiode, at which it is transformed into an electrical signal that can be processed by detection circuitry 262. The principle conductors of optical circuit 205 are optical fiber 215$x$, terminated at LED 230 and optical terminal 208$x$, and optical fiber 215$y$, terminated at optical terminal 208$y$ and detector 240. Interposed between optical terminals 208$x$ and 208$y$ is an attenuator 252, such as a mechanical screen or shutter, that is operable into an conducting state, as illustrated in FIG. 2A, and into a non-conducting state, as illustrated in FIG. 2B. When attenuator 252 is in the conducting state, optical signal 232 is conveyed through optical terminals 208$x$ and 208$y$ where it is received at detector 240 as optical signal 242. When attenuator 252 is in the non-conducting state, optical signal 232 is attenuated, where it is said that optical signal 242 is zero (or below a predetermined threshold). Detection circuitry 262 may be constructed or otherwise configured to change states based on the state of optical signal 242 (presence or absence). The state of detection circuitry 262 may compel some action, as discussed above.

Figure 3A:
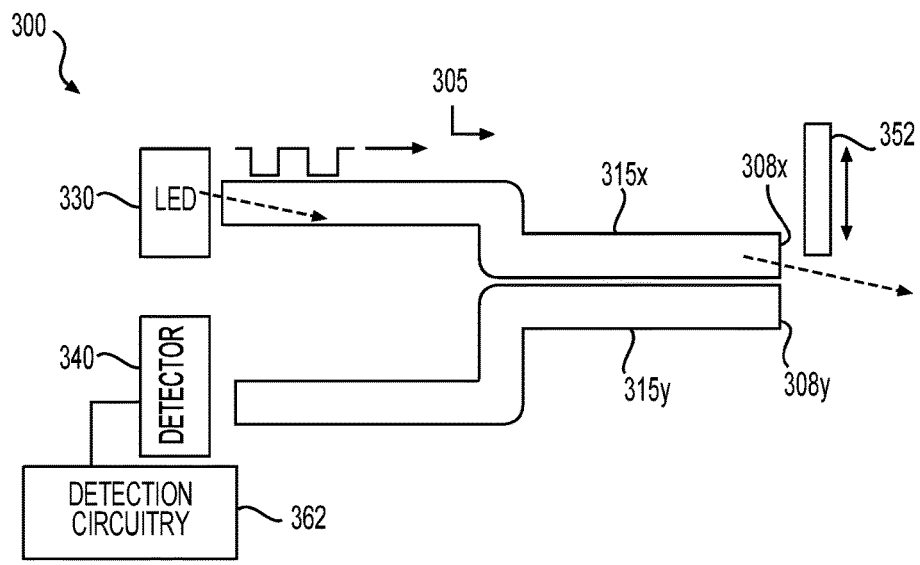
FIG. 3A and FIG. 3B are schematic diagrams of a fiber optic sensor circuit by which the present inventive concept can be embodied.
Figure 3B:
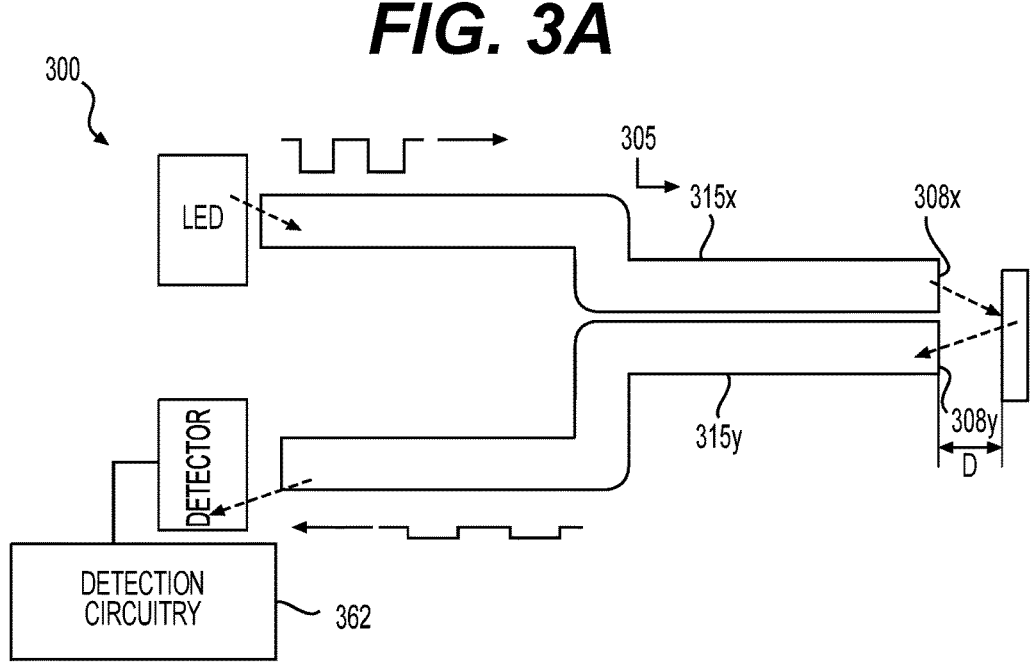

FIG. 3A and FIG. 3B, alternatively referred to as FIG. 3, are schematic diagrams of a fiber optic sensor circuit 300 by which the present invention can be embodied. The general operating principles of sensor circuit 300 are similar to those described above for sensor circuit 200 of FIG. 2. However, rather than light attenuation to operate detection circuitry 362 into a state, principles of light reflection are employed in fiber optic sensor circuit 300. In FIG. 3A, optical circuit 305 is established in a non-conducting state with the reflective surface 353 of mechanical shutter 352 being optically removed from optical fiber terminals 308$x$ and 308$y$. When reflective surface 353 is optically aligned with optical fiber terminals 308$x$ and 308$y$, as illustrated in FIG. 3B, the optical circuit 305 is in a conducting state and light from LED 330 is conveyed through optical fibers 315$x$ and 315$y$ to detector 340 and ultimately compelling a change of state in detector circuitry 362.

In certain embodiments, characteristics of optical signal 342 are dependent on the distance D of mechanical shutter 352 from optical terminals 308$x$ and 308$y$. Detector circuitry 362 may be constructed or otherwise configured to detect the characteristics for different values of the distance D. Such embodiments may be implemented to detect whether a truck lid is open or closed, for example. The distance of the shutter from the optical terminals may permit multiple states of detection such as CLOSED, WARNING, and OPEN.

Figure 4A:
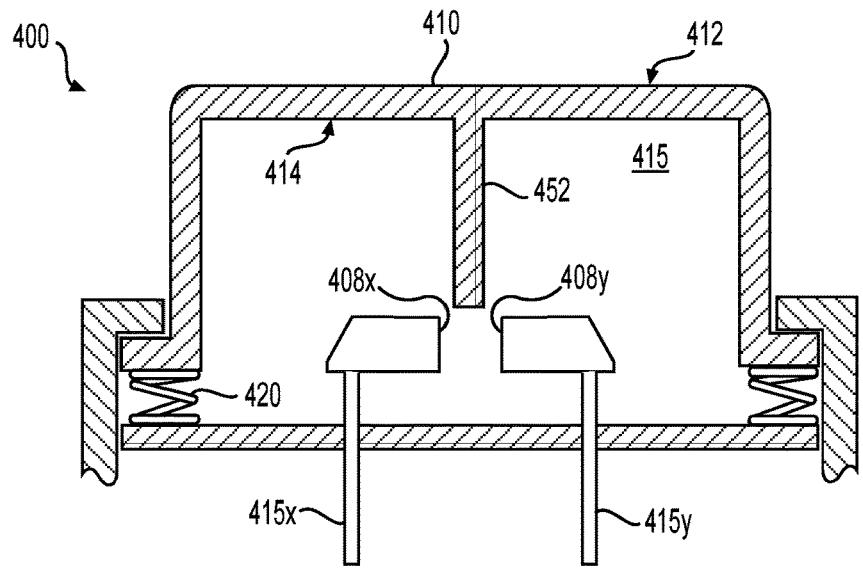
FIG. 4A and FIG. 4B are illustrations of exemplary actuators that can be utilized in embodiments of the present inventive concept.

FIG. 4A is an illustration of an exemplary actuator 400 that can be utilized in embodiments of the invention to make or break the optical circuits described above. While actuator 400 is configured as a manual pushbutton, the present invention is not so limited. Actuator 400 is merely one of several options by which an optical circuit can be compelled into different states, as will be clear to the skilled artisan upon review of this disclosure.

Actuator 400 may include a button 410 having an external surface 412 and an internal surface 414 defining an internal chamber 415. Optical fibers 415$x$ and 415$y$ may be terminated in internal chamber 415, such as by optical terminators 408$x$ and 408$y$, respectively, representatively referred to herein as optical terminator(s) 408. Optical terminators 408 represent any of a number of means by which light is allowed to pass from an end of one optical fiber, e.g., optical fiber 415$x$, into an end of another optical fiber, e.g., optical fiber 415$y$, while allowing an external device to pass between them to make or break an optical circuit.

As illustrated in FIG. 4A, button 410 may have a projection 452 formed thereon to project into chamber 415 so as to be aligned to pass between optical terminators 408 when button 410 is pressed, as described above with reference to FIG. 2. Button 410 may be biased, such as by one or more springs representatively illustrated at spring 420, such that projection 452 is removed from optical terminators 408 thereby completing an optical circuit of which terminators 408 are components. It is to be understood that while actuator 400 is biased in a normally closed configuration, i.e., the circuit is complete when projection 452 is removed from terminators 408, those skilled in the mechanical arts will appreciate that actuator 400 can be biased in a normally open configuration as well.

Figure 4B:
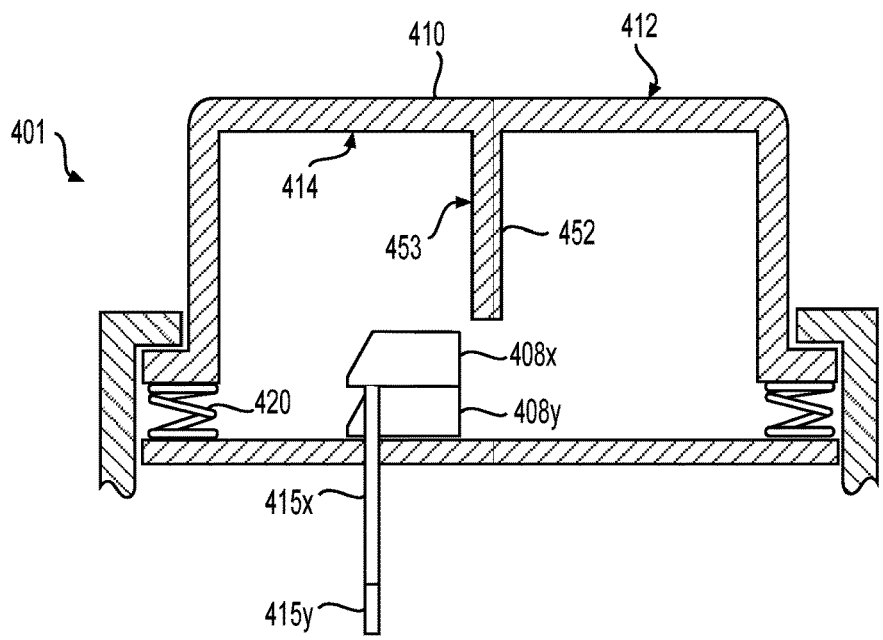

FIG. 4B is another actuator configuration 401, where like references refer to like components with FIG. 4A. In FIG. 4B, projection 452 may have a reflective surface 453 formed thereon that is facing optical terminals 408. Accordingly, when button 410 is pressed, reflective surface 453 aligns with optical terminals 408 to complete the optical circuit as described above with reference to FIG. 3.

FIG. 5 is a schematic diagram of an example fiber optic panel system 500 by which the present invention can be embodied. Fiber optic panel system 500 may include a fiber optic panel 510 and an optical circuit 505 that includes a sensor 520. Sensor 520 may comprise an optical detector 540 and an attenuator 552 optically coupled one to another via an optical fiber 515$y$. Optical circuit 505 may comprise an optical fiber 515$x$ that is bundled by ferrule 519 in optical fiber bundle 517 by which sensor 520 is optically coupled to LED 530. Thus, sensor 520 may be separated from fiber optic panel 510, but may rely on the same light source that illuminates fiber optic panel 510. Sensor 520 may include, for example, a mechanical switch housing containing a suitable actuator, e.g., a pushbutton, mechanically coupled to attenuator 552 and a suitable light detector as detector 540, such as a photodiode.

FIG. 6 is a schematic diagram of an example fiber optic panel system 600 by which the present invention can be embodied. Fiber optic panel system 600 may include a fiber optic panel 610 and an optical circuit 605 that includes a sensor 620. Sensor 620 may include an optical detector 640 and a reflector 652; however, as illustrated in the figure, detector 640 may be mounted on a chassis with LED 630 and may be removed from reflector 652, which may be located in a separate device 650. Optical circuit 605 may comprise an optical fiber 615$x$ that is bundled by ferrule 619 in optical fiber bundle 717 by which device 650 is optically coupled to LED 630 and another optical fiber 615$y$ that is external to optical fiber bundle 617 by which device 650 is optically coupled to detector 640. Device 650 may be, for example, a mechanical switch housing containing a suitable actuator, e.g., a pushbutton, mechanically coupled to reflector 652.

Embodiments of the invention may have LED 630 assembled on a chassis that may include a heatsink (not illustrated) and additional circuitry. Such assembly is referred to herein as a light assembly group (LAG) 680. As indicated above, LAG 680 may include detector 640, i.e., LED 630 and detector 640 may share a common chassis.

Figure 7:
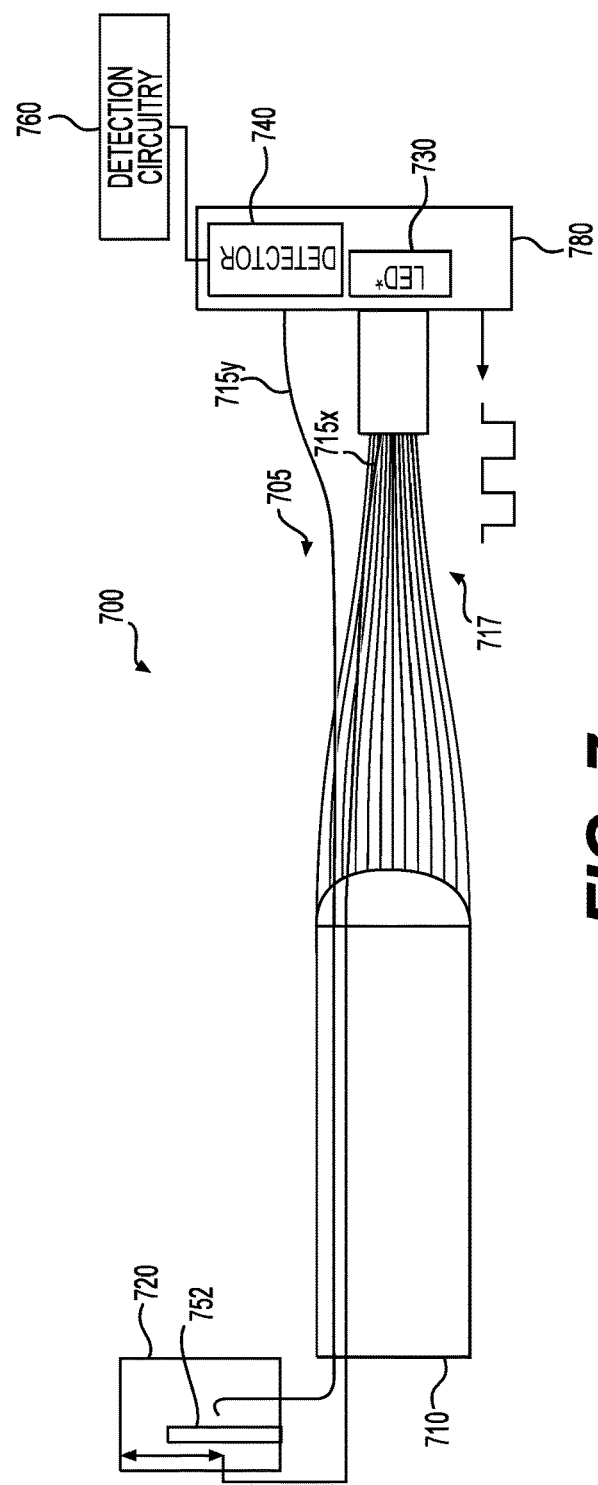
FIG. 7 is a schematic diagram of another example fiber optic panel system by which the present inventive concept can be embodied.

FIG. 7 is a schematic diagram of an example fiber optic panel system 700 by which the present invention can be embodied. Fiber optic panel system 700 includes a fiber optic panel 710 and an optical circuit 705 that includes a sensor 720 comprising an optical device 750 and a detector 740 mounted on LAG 780 with LED 730. Here, all optical fibers 715 are incorporated into fiber optic panel 710, but certain optical fibers, e.g., optical fibers 715$x$ and 715$y$, extend beyond the boundaries of the panel at the distal end thereof. As illustrated in the figure, optical fiber 715$x$ is grouped in fiber bundle 717 and optical fiber 715$y$ is removed from fiber bundle 717, but both optical fibers 715$x$ and 715$y$ are integrated into fiber optic panel 710.

Device 750 may encompass an attenuator 752 that makes or breaks a connection in optical circuit 705. Device 750 may be, for example, a mechanical switch housing containing a suitable actuator, e.g., a pushbutton, mechanically coupled to attenuator 752.

Figure 8:
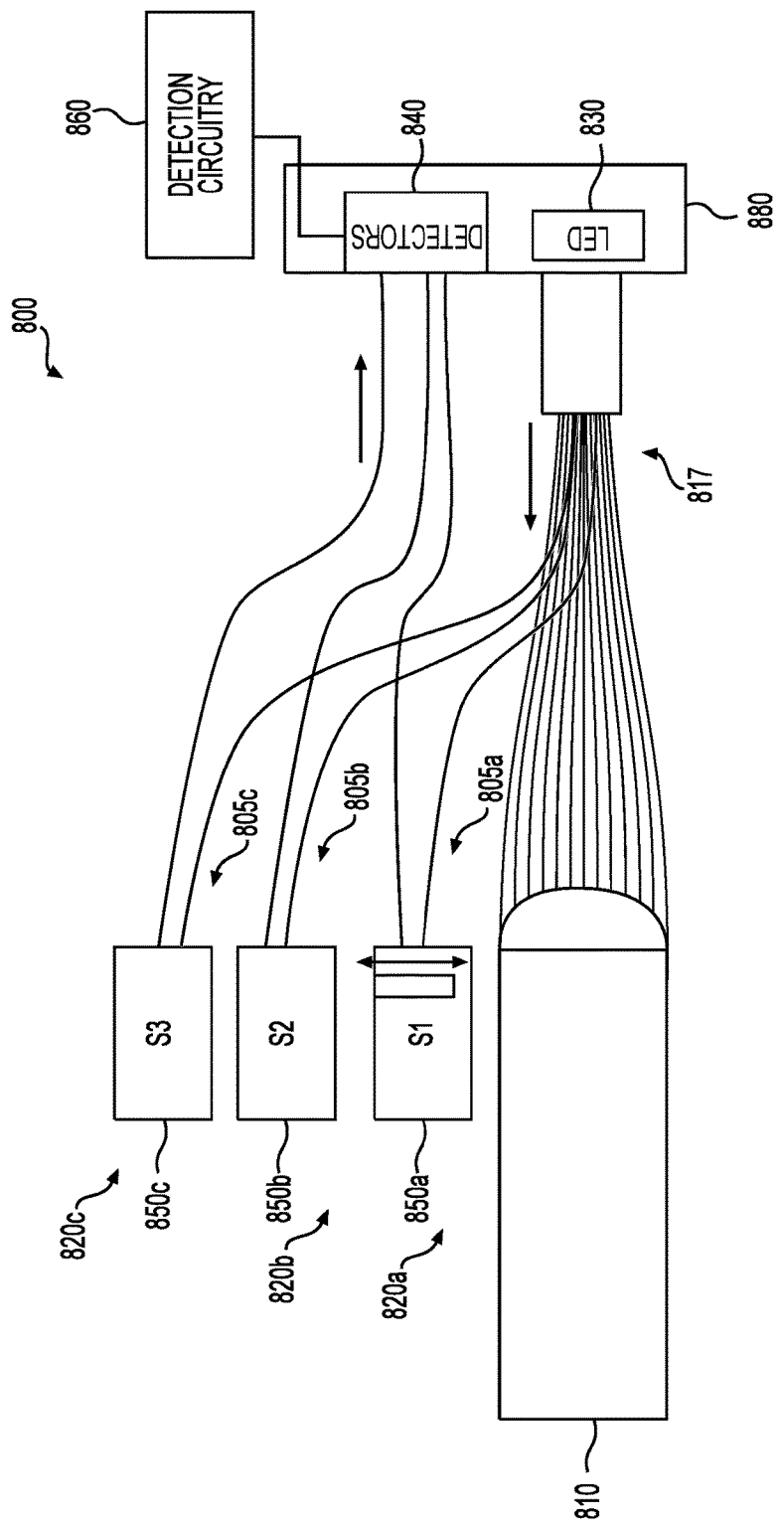
FIG. 8 is a schematic diagram of another example fiber optic panel system by which the present inventive concept can be embodied.

FIG. 8 is a schematic diagram of an example fiber optic panel system 800 by which the present invention can be embodied. Example fiber optic panel system 800 comprises a fiber optic panel 810 and optical circuits 805$a$-805$c$ that include sensors 820$a$-820$c$, respectively. Each of sensors 820$a$-820$c$ incorporate a respective sensing device 850$a$-850$c$, that may act as a switch or shutter, such as those described above and illustrated at sensing device 850$a$, but may also have different sensing modes, such as humidity, temperature, color, pressure, etc. Such devices may rely on optical characteristics of the quantity being measured or may have mechanical components by which optical characteristics are affected and can be measured. An optical reference or source signal may be provided to sensors 820$a$-820$c$ from LED 830 and each sensor device 850$a$-850$c$ may alter such signal through a physical process that reveals a quantity being measured.

Sensors 820$a$-820$c$ may also include respective detectors, which may be on a common detector array 840 mounted on LAG 880 with LED 830. Detection circuitry 860 may be driven into different states depending on separate optical signals impinging on detector array 840 or may be driven into different states based on combinations of optical signals impinging on detector array 840.

Figure 9:
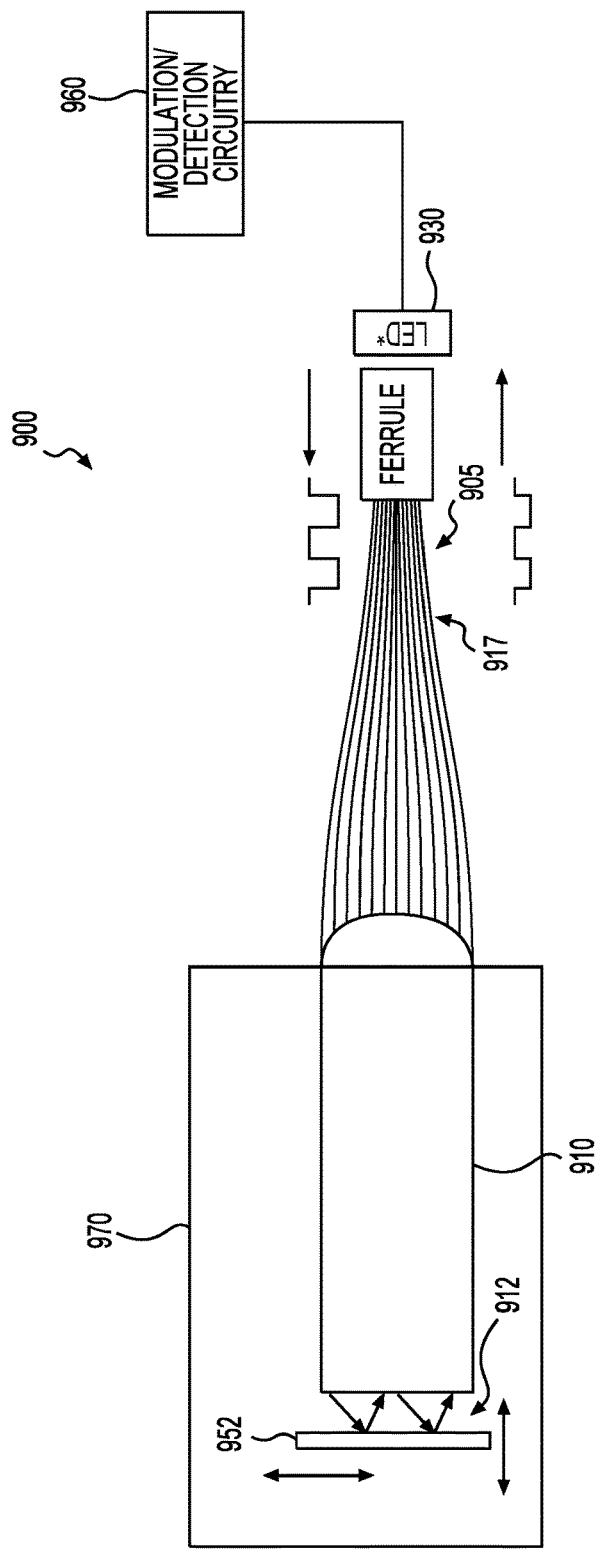
FIG. 9 is a schematic diagram of another example fiber optic panel system by which the present inventive concept can be embodied.

FIG. 9 is a schematic diagram of an example fiber optic panel system 900 by which the present invention can be embodied. Example fiber optic panel system 900 may include an optical circuit 905 that relies on light 912 that escapes from the end of fiber optic panel 910. A reflector 952 may be deployed to intercept light 912 and return it back into fiber optic panel 910, through fibers 915 of fiber bundle 917 and onto LED 930. Accordingly, LED 930 may be constructed or otherwise configured to act as both a light source and light detector. In certain embodiments, light emitted by LED 930 may be suitably modulated, such as by modulation circuitry in modulation/detection circuitry 960, in a manner by which detection circuitry in modulation/detection circuitry 960 is activated by only light 912 reflected from reflector 952.

Figure 10:
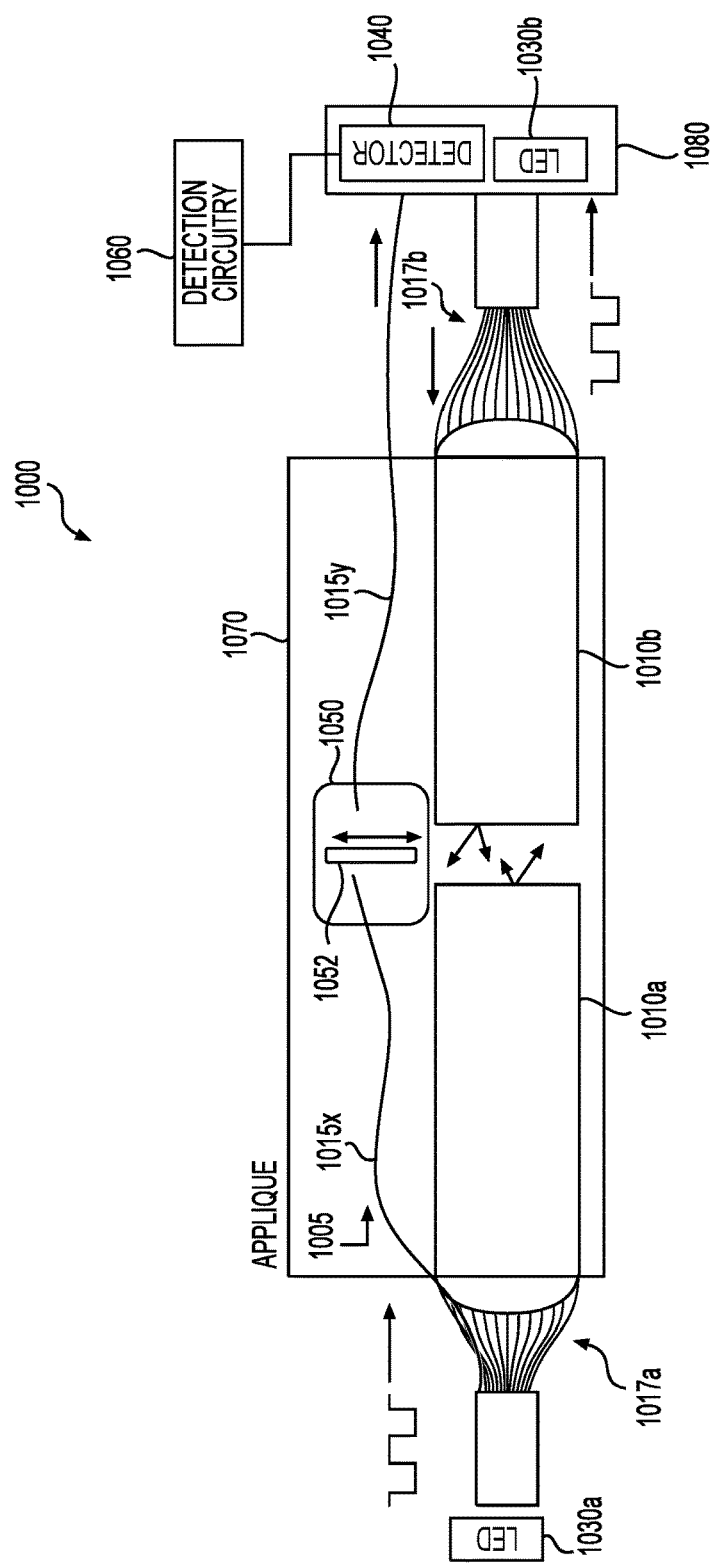
FIG. 10 is a schematic diagram of another example fiber optic panel system by which the present inventive concept can be embodied.

FIG. 10 is a schematic diagram of an example fiber optic panel system 1000 by which the present invention can be embodied. In fiber optic panel system 1000, two fiber optic panels, a fiber optic panel 1010a and a fiber optic panel 1010b, are incorporated into an applique 1070, and each of fiber optic panels 1010a and 1010b are illuminated by light from respective LEDs 1030a and 1030b through fiber bundles 1017a and 1017b, respectively. As illustrated in the figure, an optical circuit 1005 may be formed using an optical fiber 1015x that is a member of optical fiber bundle 1017b. Another optical fiber 1015y may be terminated at detector 1040 that is located with LED 1030b in LAG 1080. Applique 1070 may include a device 1050 that is a component of optical circuit 1005 that can be operated to change a state in detection circuitry 1060, as described above. A device 1050 may implement the sensing function, as described above, through an attenuator 1052 interposed between optical fibers 1015x and 1015y that completes or interrupts optical circuit 1005. Device 1050 may be realized as an ornamental element of applique 1070, such as a logo that acts as a pushbutton or the like.

Figure 11:
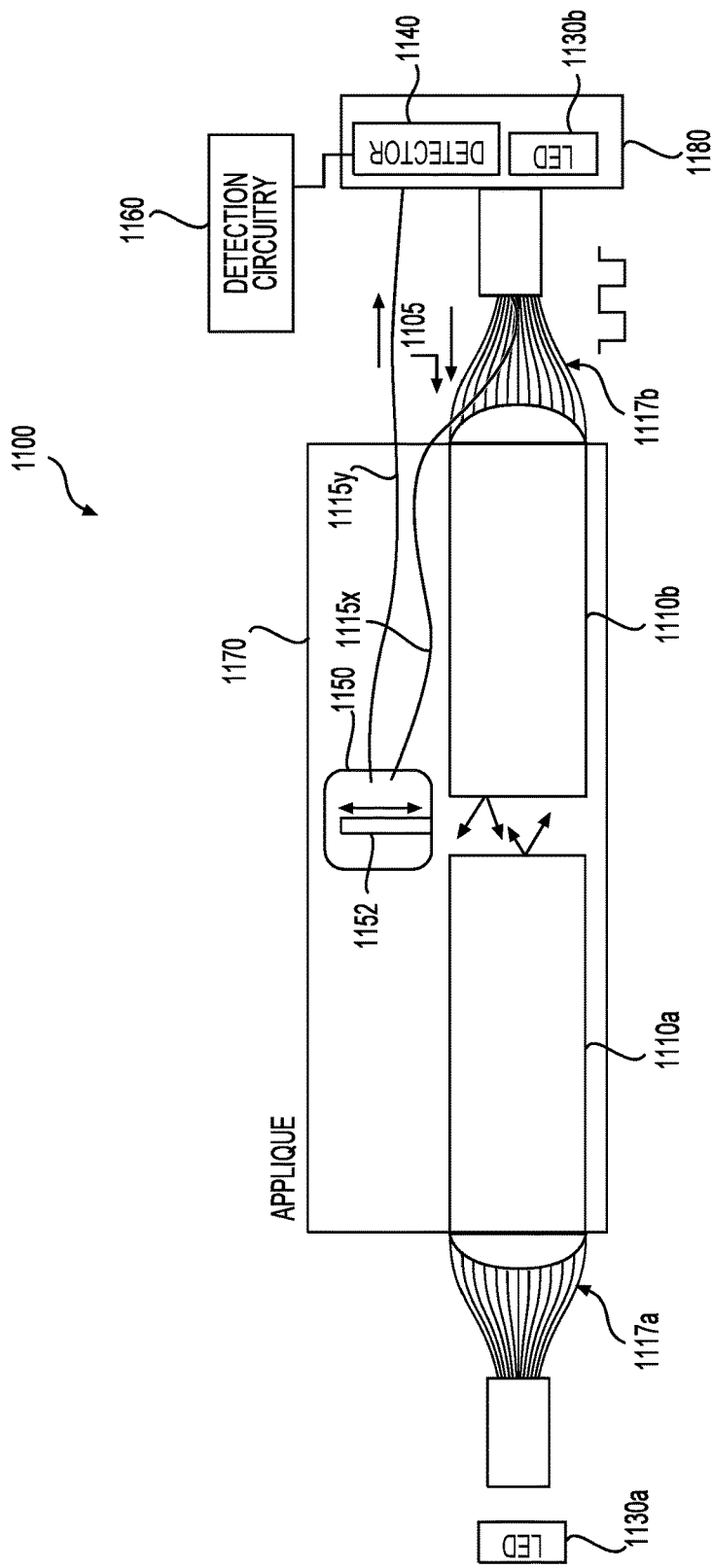
FIG. 11 is a schematic diagram of another example fiber optic panel system by which the present inventive concept can be embodied.

FIG. 11 is a schematic diagram of an example fiber optic panel system 1100 by which the present invention can be embodied. Like the example of FIG. 10, in fiber optic panel system 1100, two fiber optic panels, a fiber optic panel 1110a and a fiber optic panel 1110b, are incorporated into an applique 1170, and each of fiber optic panels 1110a and 1110b are illuminated by light from respective LEDs 1130a and 1130b through fiber bundles 1117a and 1117b, respectively. As illustrated in the figure, an optical circuit 1105 may be formed using an optical fiber 1115x that is a member of optical fiber bundle 1117b. Another optical fiber 1115y may be terminated at detector 1140 that is located with LED 1130b in LAG 1180. Applique 1170 may include a device 1150 that is a component of optical circuit 1105 that can be operated to change a state in detection circuitry 1160, as described above. Device 1150 may include a reflector 1152 interposed between optical fibers 1115x and 1115y that is used to complete or interrupt optical circuit 1105. Device 1105 may be realized as an ornamental element of applique 1170, such as a logo that acts as a pushbutton or the like.

Figure 12:
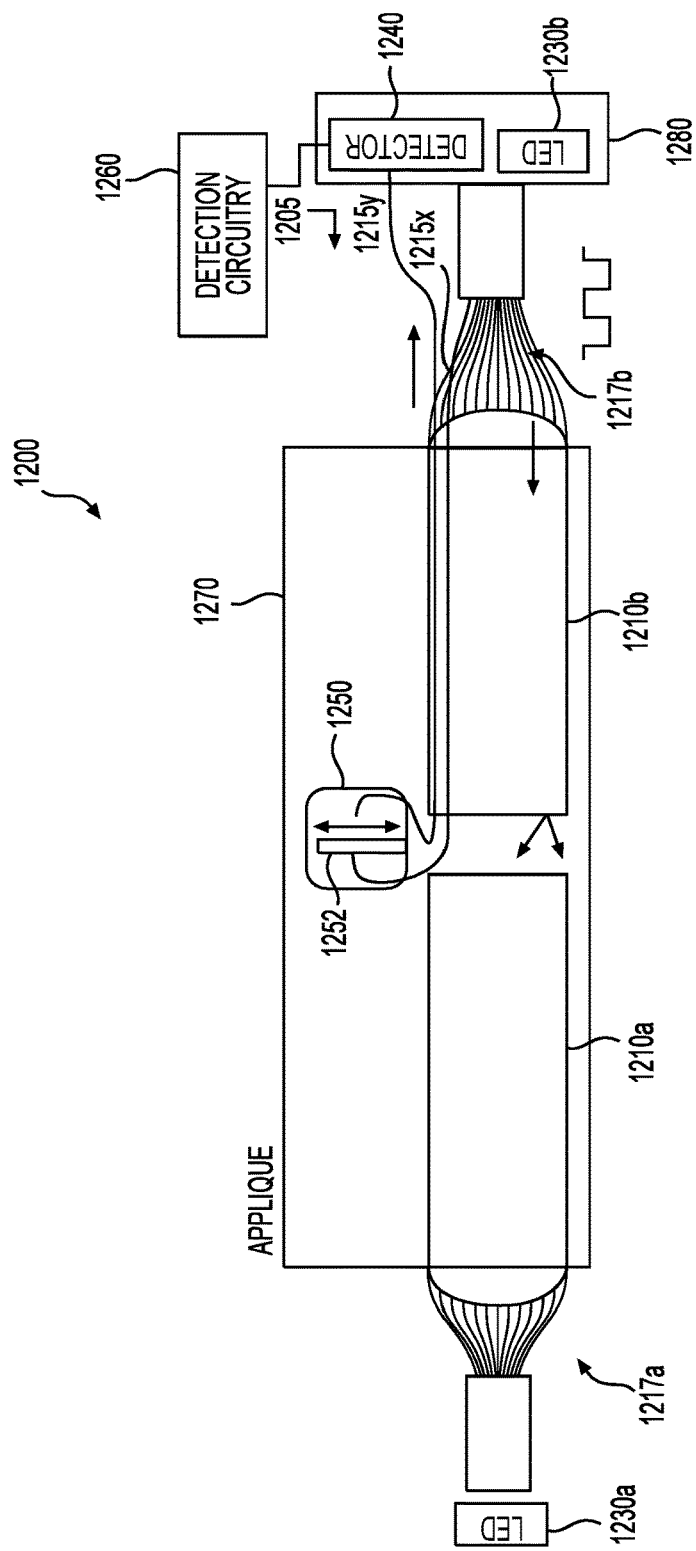
FIG. 12 is a schematic diagram of another example fiber optic panel system by which the present inventive concept can be embodied.

FIG. 12 is a schematic diagram of an example fiber optic panel system 1200 by which the present invention can be embodied. Fiber optic panel system 1200 comprises two fiber optic panels, a fiber optic panel 1210a and a fiber optic panel 1210b, incorporated into an applique 1270, and each of fiber optic panels 1210a and 1210b are illuminated by light from respective LEDs 1230a and 1230b through fiber bundles 1217a and 1217b, respectively. As illustrated in the figure, an optical circuit 1205 may be formed using an optical fiber 1215x that is a member of optical fiber bundle 1217b. Another optical fiber 1215y may be terminated at detector 1240 that is located with LED 1230b in LAG 1280. Similar to the embodiment of FIG. 7, optical fibers 1215x and 1215y are incorporated into fiber optic panel 1210b, but extend beyond the boundaries of the panel, as illustrated in the figure. Applique 1170 may include a device 1250 that is a component of optical circuit 1205 and that can be operated to change a state in detection circuitry 1260, as described above. Device 1150 may include an attenuator 1252 interposed between optical fibers 1215x and 1215y that is used to complete or interrupt optical circuit 1205 thereby performing the sensing function.

Figure 13:
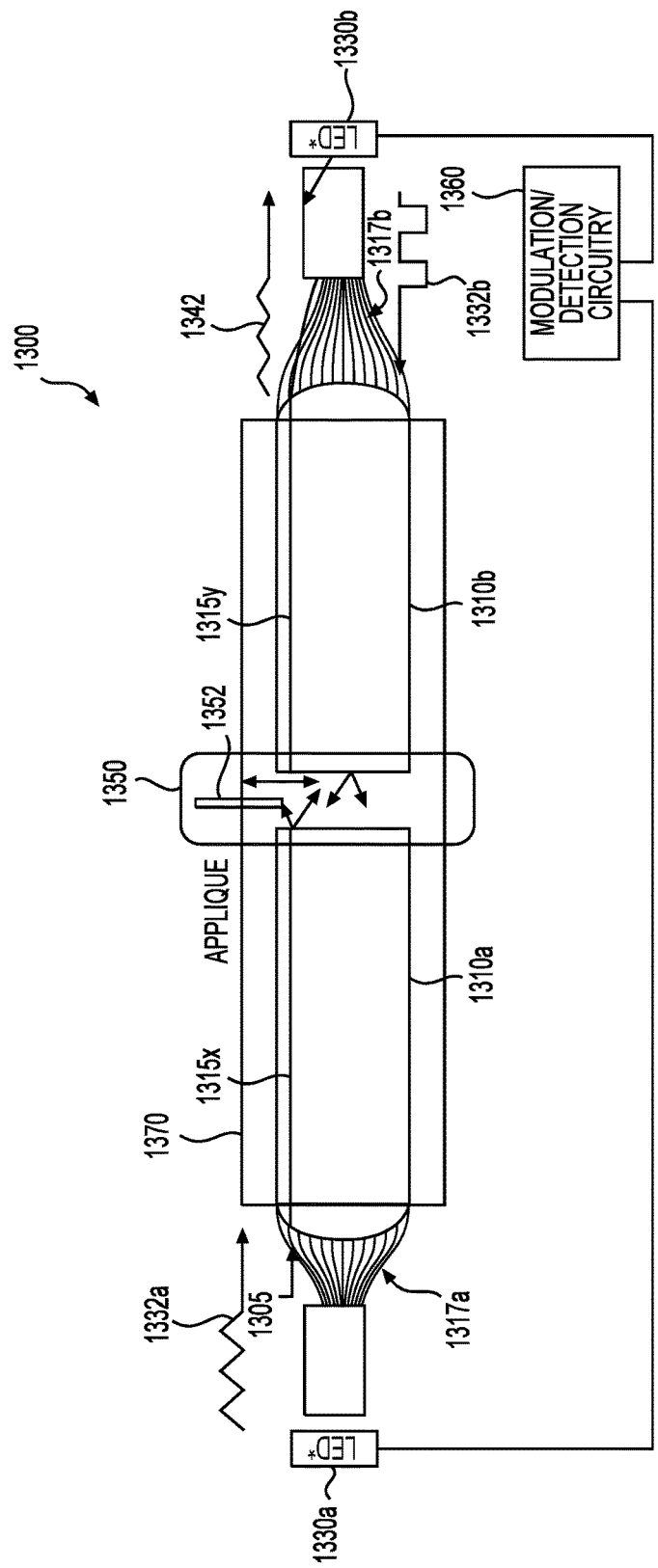
FIG. 13 is a schematic diagram of another example fiber optic panel system by which the present inventive concept can be embodied.

FIG. 13 is a schematic diagram of an example fiber optic panel system 1300 by which the present invention can be embodied. Fiber optic panel system 1300 comprises two fiber optic panels, a fiber optic panel 1310a and a fiber optic panel 1310b, incorporated into an applique 1370, and each of fiber optic panels 1310a and 1310b are illuminated by light from respective LEDs 1330a and 1330b through fiber bundles 1317a and 1317b, respectively. As illustrated in the figure, fiber optic panel system 1300 couples light from LED 1330a that escapes from the distal end of fiber optic panel 1310a to the distal end of fiber optic panel 1310b. Optical fibers 1215x and 1215y represent a set of optical fibers that emits light from the distal end of fiber optic panel 1310a and collects that light at the distal end of fiber optic panel 1310b, respectively, to form an optical circuit 1305.

Light 1332a from LED 1330a may be modulated in accordance with a modulation scheme (e.g., pulse width, color, etc.) that is different from that of light 1332b emitted from LED 1330b. LED 1330b may be configured as both a light source and light detector, but may be configured to detect only light that is modulated in accordance with the modulation scheme of LED 1330a, i.e., light 1342.

Applique 1370 may include a device 1350 that is a component of optical circuit 1305 that can be operated to change a state in modulation/detection circuitry 1360, as described above. Device 1350 may include an attenuator 1352 interposed between optical fibers 1315x and 1315y that is used to complete or interrupt optical circuit 1305, thereby performing the sensing function.

Figure 14A:
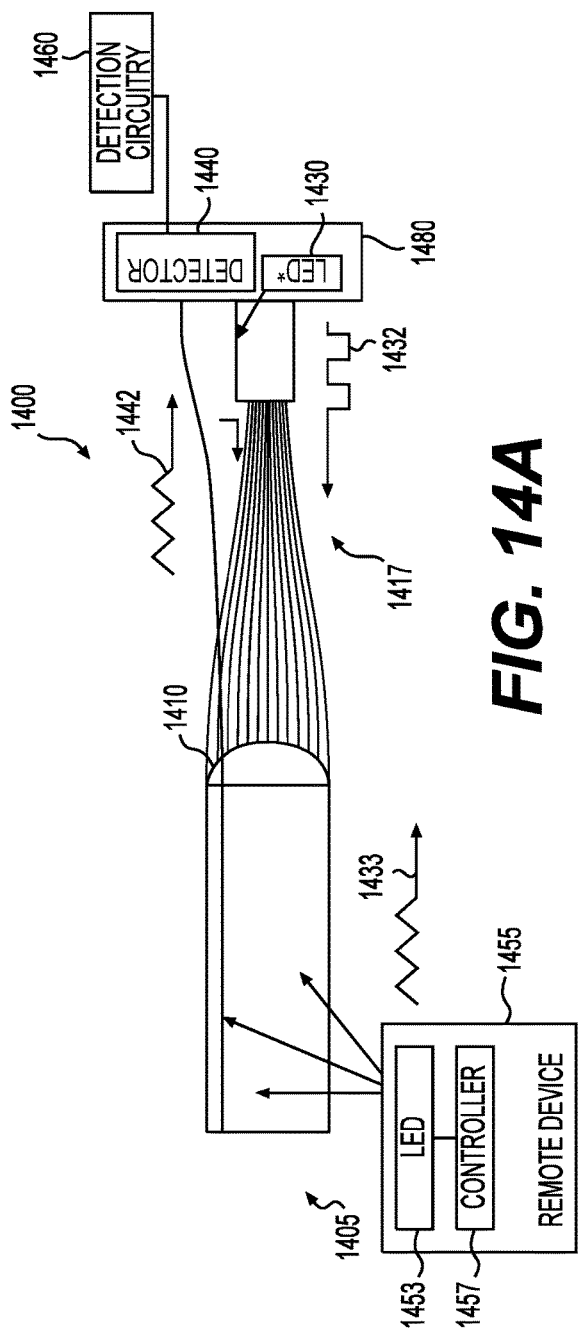
FIG. 14A and FIG. 14B are schematic diagrams of example fiber optic panel systems by which the present inventive concept can be embodied.
Figure 14B:
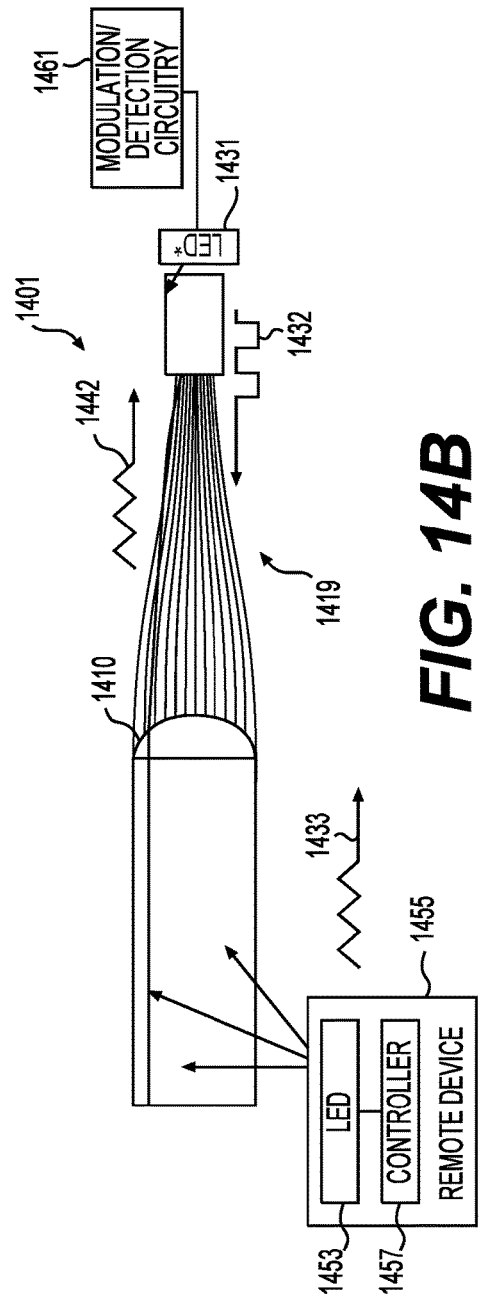

FIG. 14A and FIG. 14B, alternatively referred to herein as FIG. 14, are schematic diagrams of an example fiber optic panel systems 1400 and 1401, respectively, by which the present invention can be embodied. Fiber optic panel system 1400 includes a fiber optic panel 1410 illuminated with light 1432 from LED 1430 through fiber optic bundle 1417. Fiber optic panel system 1400 may also include an optical circuit 1405 that terminates at remote device 1455 and detector 1440, which may be collocated with LED 1430 on LAG 1480. Remote device 1455 may have onboard control circuitry 1457 and an LED 1453. Control circuitry 1457 may include modulation circuitry by which light 1433 from LED 1453 is modulated differently from the light 1432 emitted from LED 1430. Control circuitry 1457 may also include an activator (not illustrated) such as a pushbutton or the like that activates LED 1453 to emit optical signal 1433 that may be intercepted by optical fiber(s) 1415 integrated into fiber optic panel 1410. Remote device 1455 may be implemented in a small portable package, such as a key fob.

As illustrated in FIG. 14A, optical signal 1433 is conveyed through optical fiber(s) 1415 and onto detector 1440 as optical signal 1442. Optical fiber(s) 1415 may be integrated in fiber optic panel 1410, but separated from optical fiber bundle 1417. Optical signal 1442 impinging on detector 1440 may compel a change of state in detection circuitry 1460 in similar fashion to that described above.

Fiber optic panel system 1401 operates in a manner similar to fiber optic panel system 1400, with like reference numerals between FIGS. 14A-14B referring to components having like functionality. In fiber optic panel system 1401, optical fiber(s) 1415 are integrated into fiber optic panel 1410 as well as in optical fiber bundle 1419. Accordingly, optical signal 1442 impinges on LED 1431, which may be configured as both a light source (of optical signal 1432) and light detector (of optical signal 1442), as described above.

Optical signal 1442 impinging on LED 1431 may invoke a change of state in the detection circuitry of modulation/detection circuitry 1461.

FIG. 15A and FIG. 15B, alternatively referred to as FIG. 15, are schematic diagrams of an example fiber optic panel system 1500 by which the present invention can be embodied. In the example of FIG. 15A, fiber optic panel 1510 may be touch-sensitive, i.e., responsive to pressure or a change in voltage caused by capacitive coupling with, for example, a human finger. FIG. 15B is a cross-sectional view of fiber optic panel 1510 illustrating various layers thereof. As illustrated in FIG. 15B, fiber optic panel 1510 may include a touch-sensitive layer 1592, a diffuser layer 1594, an optical fiber layer 1596 and a backing layer 1598. Touch-sensitive layer 1592 may be electrically coupled to detection circuitry 1560 located on LAG 1580 such that a change of state in detection circuitry 1560 occurs when a user makes sufficient contact with touch-sensitive layer 1592.

Figure 16:
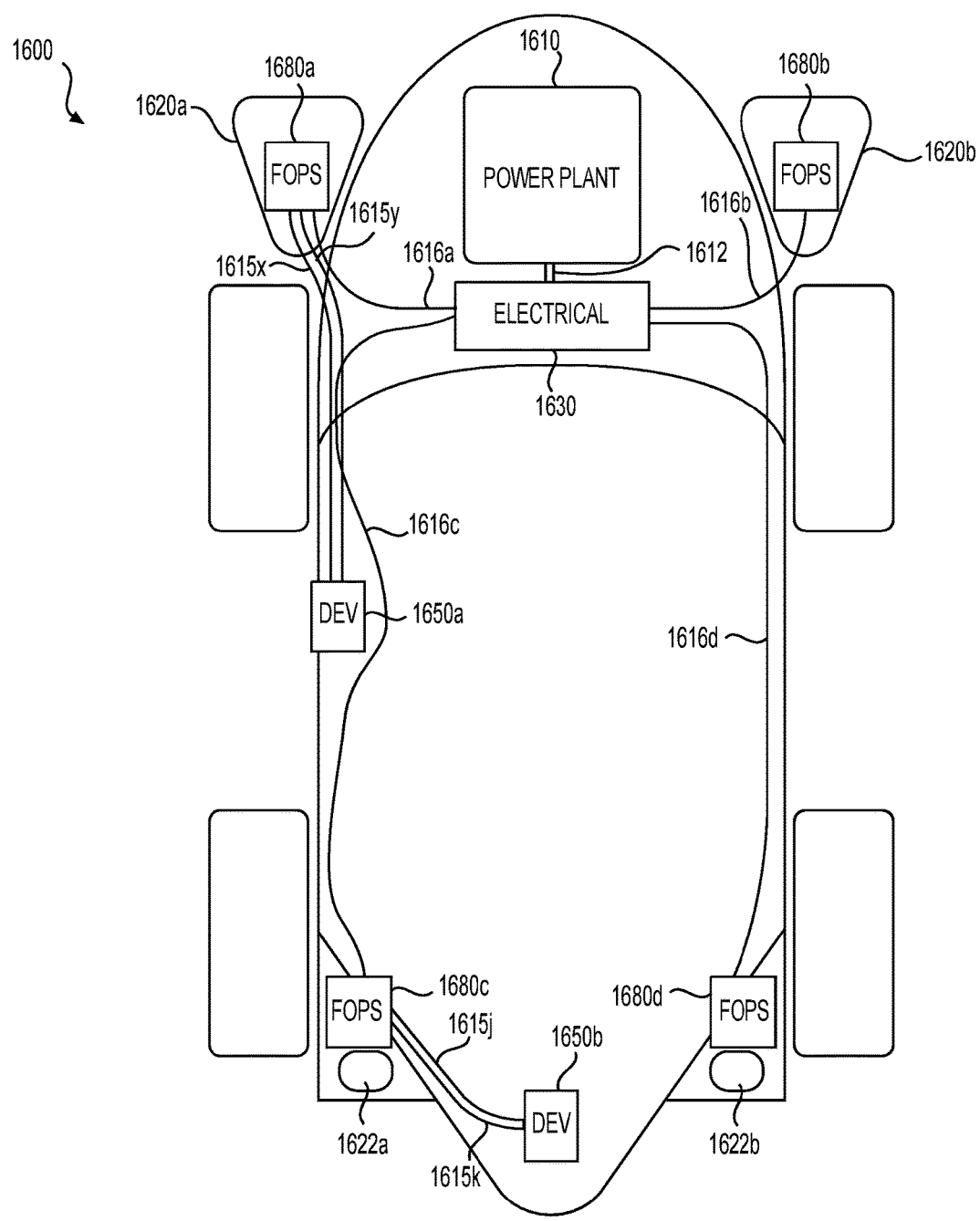
FIG. 16 is a schematic diagram of an example vehicle in which the present inventive concept can be embodied.

FIG. 16 is a schematic diagram of an example vehicle 1600 in which the present invention can be embodied. Vehicle 1600 may have a power plant 1610, such as an internal combustion engine, mechanically coupled to electrical system 1630 to generate electricity therein, such as through an alternator or the like. Electrical system 1630 may be electrically coupled to one or more fiber optic panel systems (FOPSs) 1680a-1680d, representatively referred to herein as FOPS(s) 1680, through electrical cabling or wiring harnesses 1616a-1616d, representatively referred to herein as electrical cabling 1616. Each FOPS 1680 may comprise an LED, a detector and/or electrical circuitry that may be optically coupled to a fiber optic panel. Such implementation details are described above and have been omitted from FIG. 16 to avoid congesting the figure. For purposes of example, two FOPSs 1680a and 1680b are deployed in headlights 1620a and 1620b, respectively, and two FOPSs 1680c and 1680d are deployed in taillights 1622a and 1622b, respectively. Other FOPSs 1680 may be deployed as well, such as for the appliques described above.

One or more FOPSs 1680 may have an optical circuit that includes a sensor circuit, such as those described above. For example, a sensor device 1650a may be deployed on a panel located on the driver's side door (not illustrated) of vehicle 1600 and one sensor device 1650b may be deployed on a rear hatch or trunk (not illustrated) of vehicle 1600. Sensor device 1650a may have an actuator that is used to open the driver's side door, and device 1650b may have an actuator that is used to open the rear hatch of vehicle 1600. Sensor device 1650a may be optically coupled to FOPS 1680a through optical fibers 1615x and 1615y and sensor device 1650b may be optically coupled to FOPS 1680c through optical fibers 1615j and 1516k as described above. Application to interior lighting is also possible. For example, to turn a Map light, Ambient light or Dome light ON/OFF, or to provide a Notification/Alert from a passenger to the driver. Hazard warning light/button, or any general button in car may implement a fiber optic panel that lights up with a graphic and is touch sensitive to activate the function. Still further, an ambient light that detects the proximity of a person to a vehicle panel, this may be used to detect if someone's head is too close to an airbag, or for seat movements, like reclining, or moving back or forward. FOPSs 1680 may be implemented in any of the examples described above.

The embodiments described above demonstrate different configurations and operational modes that can be combined or interchanged in other embodiments of the invention. Upon review of this disclosure, those having skill in the art will recognize and appreciate various configurations and operational modes that can be realized in embodiments of the present invention without departing from the spirit and intended scope thereof.

The electrical circuitry described herein, e.g., detection circuitry, modulation circuitry, may include processor circuitry such as, for example, microprocessors, microcontrollers, systems on a chip (SOCs), or other fixed or programmable logic, that may execute instructions for process logic stored in a memory (not illustrated). The processors may themselves be multi-processors, and have multiple CPUs, multiple cores, multiple dies comprising multiple processors, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:

1. An apparatus comprising:
   a plurality of optical fibers being grouped at one end thereof in a bundle so as to optically couple to a common light source, a set of the optical fibers being configured to emit light transversely to the optical axes thereof to form an illumination region in a fiber optic panel;
   a detector that generates an electrical signal in response to an optical signal impinging thereon; and
   an optical switch being operable into a conducting state in which the optical signal is conveyed through the optical switch and onto the detector, and a non-conducting state in which the optical signal is prevented from being conveyed through the switch and onto the detector.

2. The apparatus of claim 1, wherein the optical switch includes an actuator by which a human user operates the switch into the conducting state and the non-conducting state.

3. The apparatus of claim 1, wherein the detector is the light source.

4. An apparatus comprising:
a light source;
a plurality of optical fibers optically coupled to the light source, a set of the optical fibers being configured to emit light from the light source transversely to the optical axis thereof to form an illumination region in a fiber optic panel; and
at least one sensor optically coupled to at least one of the optical fibers so as to receive an optical signal from the light source, the sensor generating an electrical signal in response to a physical phenomenon, the sensor comprising an optical switch and a detector that generates the electrical signal in response to the optical signal impinging thereon, the optical switch being operable into a conducting state in which the optical signal is conveyed through the optical switch and onto the detector, and a non-conducting state in which the optical signal is prevented from being conveyed through the switch and onto the detector.

5. The apparatus of claim 4, wherein the sensor includes an actuator by which a human user operates the optical switch into the conducting state and the non-conducting state.

6. The apparatus of claim 4, wherein the sensor includes a detector is mounted on a chassis with the light source.

7. The apparatus of claim 6, wherein the detector is the light source.

8. The apparatus of claim 4, wherein the at least one sensor is a plurality of sensors optically coupled to the light source.

9. A lighting apparatus comprising:
a light source configured to generate an optical signal;
at least one fiber optic panel comprising a plurality of optical fibers grouped in a fiber optic bundle that is optically coupled to the light source;
a detector that generates an electrical signal in response to the optical signal impinging thereon; and
an optical switch being operable into a conducting state in which the optical signal is conveyed through the optical switch and onto the detector, and a non-conducting state in which the optical signal is prevented from being conveyed through the switch and onto the detector.

* * * * *